US009974713B1

(12) United States Patent
Song et al.

(10) Patent No.: US 9,974,713 B1
(45) Date of Patent: May 22, 2018

(54) LOCKED PILL BOTTLE WITH TIMED DISPENSE LIMITS

(71) Applicants: Michael Song, Old Tappan, NJ (US); Rebecca Song, Old Tappan, NJ (US)

(72) Inventors: Michael Song, Old Tappan, NJ (US); Rebecca Song, Old Tappan, NJ (US)

( * ) Notice: Subject to any disclaimer, the term of this patent is extended or adjusted under 35 U.S.C. 154(b) by 0 days. days.

(21) Appl. No.: 15/465,187

(22) Filed: Mar. 21, 2017

Related U.S. Application Data

(63) Continuation of application No. 14/860,807, filed on Sep. 22, 2015, now Pat. No. 9,636,279.

(51) Int. Cl.

| | |
|---|---|
| ***B65G 59/00*** | (2006.01) |
| ***B65H 3/44*** | (2006.01) |
| ***B65D 83/00*** | (2006.01) |
| ***G04B 37/00*** | (2006.01) |
| ***A47F 3/00*** | (2006.01) |
| ***A61J 7/04*** | (2006.01) |
| ***A61J 1/03*** | (2006.01) |
| ***B65D 83/04*** | (2006.01) |
| ***B65D 41/02*** | (2006.01) |

(52) U.S. Cl.
CPC ............... *A61J 7/0427* (2015.05); *A61J 1/03* (2013.01); *B65D 41/02* (2013.01); *B65D 83/0409* (2013.01)

(58) Field of Classification Search
CPC ........... B65G 59/00; B65H 3/44; B65E 59/00; G04B 37/00; A47F 3/00; B65D 79/00
USPC ................... 340/5.28; 221/93, 103, 264, 268
See application file for complete search history.

(56) References Cited

U.S. PATENT DOCUMENTS 3,638,830 A * 2/1972 Belokin, Jr. ....... B65D 83/0409 206/533
3,730,388 A * 5/1973 Bender ..................... A61J 7/02 141/94
3,741,383 A * 6/1973 Wittwer ............. B65D 81/3216 206/219
4,117,956 A * 10/1978 von Schuckmann ..... B65D 83/0427 221/288
4,127,190 A * 11/1978 Sunnen ..................... A61J 7/04 116/216
4,230,236 A * 10/1980 Boulter ............. B65D 83/0409 221/190
4,405,060 A * 9/1983 Hsei ................... B65D 83/0409 221/135
4,415,098 A * 11/1983 Haas .................. B65D 83/0409 221/202

(Continued)

*Primary Examiner* — Nam V Nguyen
(74) *Attorney, Agent, or Firm* — Michael J. Feigin, Esq.; Feigin & Fridman LLC

(57) ABSTRACT

The disclosed pill bottle allows for timed dispensing of medicine, as programmed by a physician, pharmacist, or caregiver. The device has a slot for pill entry in any one of the walls, the slot being sealable and lockable. In an unlocked and open condition, the slot is a portal from the outside of the bottle into an inner cavity, the cavity being adapted for pill storage and extending between the slot/opening for pill entry and an exit tube. The exit tube is sized for single-file passage of a plurality of pills. A button or blocking device (defined as a mechanical and/or physical object which prevents movement of a pill out of the device) is movable only at pre-programmed intervals of time, allowing the exit of a pill or dosage of pills.

17 Claims, 12 Drawing Sheets

(56) References Cited

U.S. PATENT DOCUMENTS

| | | | | | |
|---|---|---|---|---|---|
| 4,457,451 | A * | 7/1984 | Ichikawa | B65G 47/1407 | 221/190 |
| 4,519,515 | A * | 5/1985 | Schonberger | B65D 55/026 | 215/230 |
| 4,573,606 | A * | 3/1986 | Lewis | A61J 7/0481 | 221/15 |
| 4,648,529 | A * | 3/1987 | Blakemore | B65D 81/22 | 210/803 |
| 5,174,471 | A * | 12/1992 | Kozlowski | B65D 83/0409 | 206/536 |
| 5,460,295 | A * | 10/1995 | Law | A44C 5/003 | 221/185 |
| 5,667,097 | A * | 9/1997 | Joyce | B65D 83/0409 | 221/264 |
| 5,816,441 | A * | 10/1998 | Farside | B65D 83/0409 | 221/152 |
| 6,098,794 | A * | 8/2000 | Lin | A47G 19/2227 | 206/217 |
| 6,131,765 | A * | 10/2000 | Barry | A47F 1/035 | 221/264 |
| 6,189,731 | B1 * | 2/2001 | Schmitt | A61F 15/001 | 221/103 |
| 6,206,235 | B1 * | 3/2001 | Green | B65D 83/0409 | 221/204 |
| 6,267,265 | B1 * | 7/2001 | Issa | A61J 7/0076 | 221/263 |
| 6,529,446 | B1 * | 3/2003 | de la Huerga | A61J 1/1437 | 368/10 |
| 6,726,058 | B2 * | 4/2004 | Giraud | B65D 83/0409 | 221/267 |
| 6,889,826 | B2 * | 5/2005 | Harada | A47G 7/06 | 206/219 |
| 7,036,681 | B2 * | 5/2006 | Suda | B65D 83/0409 | 221/210 |
| 7,073,685 | B1 * | 7/2006 | Giraud | B65D 83/0409 | 221/260 |
| 7,214,385 | B2 * | 5/2007 | Gruber | A61K 9/2013 | 424/451 |
| 7,614,512 | B2 * | 11/2009 | Nader | B65D 1/04 | 206/217 |
| 7,988,016 | B2 * | 8/2011 | Klein | B65D 50/062 | 221/1 |
| 8,657,155 | B2 * | 2/2014 | Dwork | B65D 47/0866 | 221/229 |
| 8,910,830 | B2 * | 12/2014 | May | B05C 17/00553 | 222/129 |
| 8,936,175 | B1 * | 1/2015 | Song | A61J 7/0472 | 221/15 |
| 9,027,806 | B1 * | 5/2015 | Gioggia | A45F 5/021 | 224/148.4 |
| 9,283,150 | B2 * | 3/2016 | Bujalski | A61J 7/0445 | |
| 9,636,279 | B2 * | 5/2017 | Song | A61J 7/0427 | |

* cited by examiner

LOCKED PILL BOTTLE WITH TIMED DISPENSE LIMITS

FIELD OF THE DISCLOSED TECHNOLOGY

The disclosed technology relates generally to pill bottles and, more specifically, to locked pill bottles with limits on pill dispensing.

BACKGROUND OF THE DISCLOSED TECHNOLOGY

Most people take medicine only for the conditions for which their doctors prescribed them. However, an estimated 20% percent of people in the United States have used prescription drugs for non-medical reasons, according to the National Institute for Health. Prescription drug abuse is a serious and growing problem, often leading to addiction to narcotics, sedatives, and stimulants.

In order to prevent abuse of narcotics, prior art has been developed in the form of lockable pill bottles and time release pill bottles. Lockable pill systems are often prone to tampering, and require very different structures than people are accustomed to using, creating a barrier to entry. One example of a lockable pill device is disclosed in U.S. Pat. No. 6,401,991 to Eannone, disclosing a computer-timed and locked medication container. This device has a plurality of compartments, and at an appropriate time, a next compartment is opened, allowing release of medicine.

What is required in the art is a secure method of storing and dispensing pills, that an end-user can be relied on to use, without being supervised by a third party. Still further, there is a need in the art for a method of dispensing pills in a way which prevents abuse.

SUMMARY OF THE DISCLOSED TECHNOLOGY

An embodiment of the disclosed technology is a lockable pill bottle for a plurality of pills. While "pill," in the singular is used, it should be understood that a dosage of pills may include a single pill or a plurality of pills. A device used has a bottom wall, side wall, and top wall. The device has a slot for pill entry in any one of the walls, the slot being sealable and lockable. In an unlocked and open condition, the slot is a portal from the outside of the bottle into an inner cavity, the cavity being adapted for pill storage and extending between the slot/opening for pill entry and an exit tube. The exit tube is sized for single-file passage of a plurality of pills.

A timing device is used, in embodiments of the disclosed technology, enabling release of a pill of the plurality of pills only at specified times. In embodiments of the lockable pill bottle, during intervals of time, the timer causes the button extending through the wall to be non-functional by preventing its movement. This may be accomplished mechanically or by disabling an electric component required to operate the button.

In a variation on any of the above embodiments, the timer enables release of the pill by allowing rotation or movement of a blocking device. Using the button, or by moving the blocking device (such as a push button, slider, or rotatable member), a pill can pass through or past the blocking device and exit tube to a release area.

Embodiments of a lockable pill bottle for a plurality of pills have a container with pill holder and funnel (device with wider and narrower end) directing the plurality of pills in the container into a shaft. In the shaft, at least some of the pills may be single file (one on top of other, with each pill touching no more than two other pills on either side thereof). The shaft is in continuous communication (defined as having a hollow region which connects, adjoins, or abuts with a space of no more than 2 cm between the two devices which are in continuous communication) with the funnel. A movable blocking device fixedly attached to the pill bottle has multiple positions. In a first position, it is locked in place with a portal of the movable blocking device being in continuous communication with the shaft. In a second position, the portal is spaced apart from, and no longer in communication with, the shaft.

A timing mechanism (such as a timer), after a pre-determined amount of time (such as every four hours, or every 20 minutes, or 30 minutes from a previous opening, or from a set beginning time) unlocks the movable blocking device to allow the blocking device to be manually moved, or causing it to automatically move, to the second position. The portal is open to an exterior of the pill bottle after the blocking device is manually moved to the second position. Upon detection of movement of the movable blocking device and return of the movable blocking device to the first position with the shaft in communication with the portal, said movable blocking device is locked again for a new length of time equal to the first pre-determined period of time. It is thus locked for a new period of time after a pill has been taken out. Or, when the time is static and unchanging with respect to when the pill is taken out, the movable blocking device is locked again for an amount of time equal to the pre-determined period of time, minus an amount of time passed since a previous pre-determined period of time has passed.

The width (or, equivalently, the inner circumference of the hollow areas thereof), the shaft, and the portal (of the movable blocking device) can be equal. The shaft can be translucent such that at least some of the plurality of pills in the shaft are visible, in single file, from an outside of the pill bottle. In this manner, one can see if there are pills in the shaft and/or portal before trying to eject them out of the bottle, potentially resetting the timer. In the second position, a pill of the plurality of pills is removable from the portal which, in this position, is open to the exterior of the pill bottle. If one tries to tamper with the bottle, an opioid antagonist, in embodiments of the disclosed technology, will destroy (chemically change to remove at least a majority of the drug's effect) a narcotic or other drug contained or comprised within pills. Such opioid antagonists can be placed within the walls of the pill bottle and/or shaft.

After removal of a/the pill open to the exterior of the pill bottle from the portal, one must refill the shaft to replace the pill taken out, in embodiments of the disclosed technology. Or, at least, once the shaft is devoid of pills, and/or the portal is devoid of pills, in embodiments one refills the shaft with an additional pill or pills by turning the bottle at an angle such as nearly upside down (135 to 179 degrees), upside down (180 degrees), or at least 90 degrees from a direction of the bottle when the removal took place or compared to the bottom side (as defined in the next paragraph) being downward gravitationally from the rest of the device.

The movable blocking device slides from the first position with the portal in communication with the shaft into the second position with the pill open to the exterior of the pill bottle, in embodiments. This sliding can be accomplished in one of several different ways. It can be done by lateral movement (lateral being with respect to the top and bottom of a pill bottle, the top and bottom being defined as smaller than the elongated walls extending there-between, and at least the bottom side being flat. A portal is cut into an elongated side of such a movable blocking device, in this embodiment. Or, in another embodiment, the sliding is circumferentially around a point at which the movable blocking device is attached to the pill bottle, again with the portal cut into the blocking device. The circumferential rotation of the blocking device can be perpendicular parallel to an exterior side of the pill bottle or bottom thereof, depending on embodiment. The movable blocking device can have multiple portals which extend through and/or cut into the movable blocking device, such that a pill in a portal of the multiple portals touches a base of the pill bottle. A single portal of the multiple portals can be in communication with the shaft when a single different (other) portal of the multiple portals allows the pill to exit from the pill container by being open to the exterior and outside of the pill bottle simultaneous to the first portal lined up with (in communication with) the shaft.

The sliding can be in a direction circumferentially away from the exterior of the pill bottle about an axis which is stationary with respect to the exterior of the pill bottle, such that, in the second position of the blocking device, the portal extends at an acute angle with respect to the shaft, the angle having a vertex, this vertex crossing or below the shaft. In this embodiment, the movable blocking device can be a push button which is pushed inwards towards the vertical center of the pill bottle, and then is pushed outward, exposing a portal and pill there-in. As such, it can start substantially flush or parallel to the exterior of the pill bottle and then extend outward from the pill bottle.

In a method of the disclosed technology, a pill dispenser is configured to, or has pills placed into, an opening which opens into a cavity of the pill bottle. The pill bottle has a lower wall, side walls, and top wall. The opening is then closed and locked, and designated time intervals are configured, or act, to allow dispensing of pills, only at those intervals of time. Dispensing of pills is defined as allowing a pill to exit to a release area where a user can obtain the pill at any time the user wishes, or releasing the pill from the bottle when the user presses a button or moves a block device, indicating that a pill should be released.

Embodiments described with reference to the device of the disclosed technology are equally applicable to methods of use thereof.

"Substantially" and "substantially shown," for purposes of this specification, are defined as "at least 90%," or as otherwise indicated. Any device may "comprise" or "consist of" the devices mentioned there-in, as limited by the claims.

It should be understood that the use of "and/or" is defined inclusively such that the term "a and/or b" should be read to include the sets: "a and b," "a or b," "a," "b."

DETAILED DESCRIPTION OF EMBODIMENTS OF THE DISCLOSED TECHNOLOGY

The disclosed pill bottle allows for timed dispensing of medicine, as programmed by a physician, pharmacist, or caregiver. The device has a slot for pill entry in any one of the walls, the slot being sealable and lockable. In an unlocked and open condition, the slot is a portal from the outside of the bottle into an inner cavity, the cavity being adapted for pill storage and extending between the slot/opening for pill entry and an exit tube. The exit tube is sized for single-file passage of a plurality of pills. A button or blocking device (defined as a mechanical and/or physical object which prevents movement of a pill out of the device) is movable only at pre-programmed intervals of time, allowing the exit of a pill or dosage of pills.

Embodiments of the disclosed technology will become clearer in view of the following description of the drawings.

Figure 1:
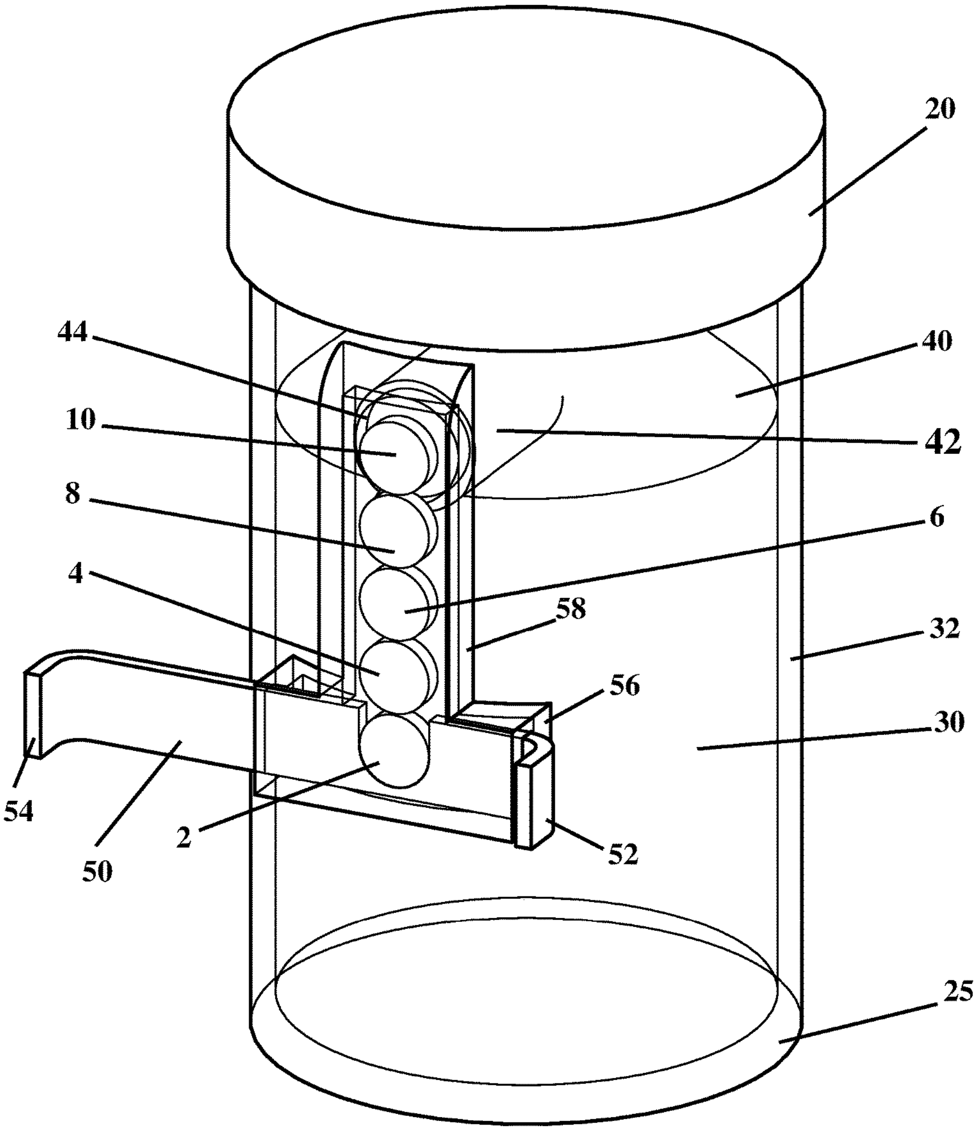
FIG. 1 shows a lockable pill bottle with slide release mechanism of an embodiment of the disclosed technology.

FIG. 1 shows a lockable pill bottle with slide release mechanism of an embodiment of the disclosed technology. The pill bottle has a cover or lid 20 which is attached to the top of a bottle having an interior 40 and base 25. The interior and base can be formed of unitary construction. A layer 32 can be solid or hollow, being or having within it an opioid antagonist or other drug or chemical which destroys the narcotic or other medical/physiological effect on the body that pills within the bottle cause to the body. The layer 32 can be transparent or translucent as well as the opioid antagonist, or at least a part thereof of one or the other. In this manner, the pills on the inside of the bottle can be visible. In other embodiments, the layer 32 is a plastic layer or comprises air and is translucent.

Referring still to FIG. 1, one inserts pills by opening the pill bottle, such as by taking off the lid 20 into the interior space. A plurality of pills can be placed in the interior housing 30 and exit through a funnel 40. The bottle is turned upside down from the orientation shown and/or the orientation of a direction of exit of the pills in the exit tube 44. The pills thus exit from the interior space 30 into the funnel 40 through to the shaft/exit tube 44. The shaft/exit tube is a hollow tube with space for pills, the hollow area continuing or creating a continuous structure with the funnel 42 and portal of a movable mechanism. The exit tube 44 is formed from, in one embodiment, the inner surface of the body of the pill bottle 30 or inner layer 32, as well as a vertical tube 58 and/or horizontal tube 56. Here, pills 2, 4, 6, 8, and 10 are shown in the exit tube, with pill 2 further loaded into the movable mechanism which is a block device 50. The blocking device blocks pills from exit and is moved to then allow a single pill to exit at a time.

With regard to the description of FIG. 1 up to this point, the description is generally and/or specifically applicable to parts of the embodiments shown in the remaining figures as well. The embodiments described below use more specific parts or different blocking devices. Each will be discussed in turn.

Figure 2:
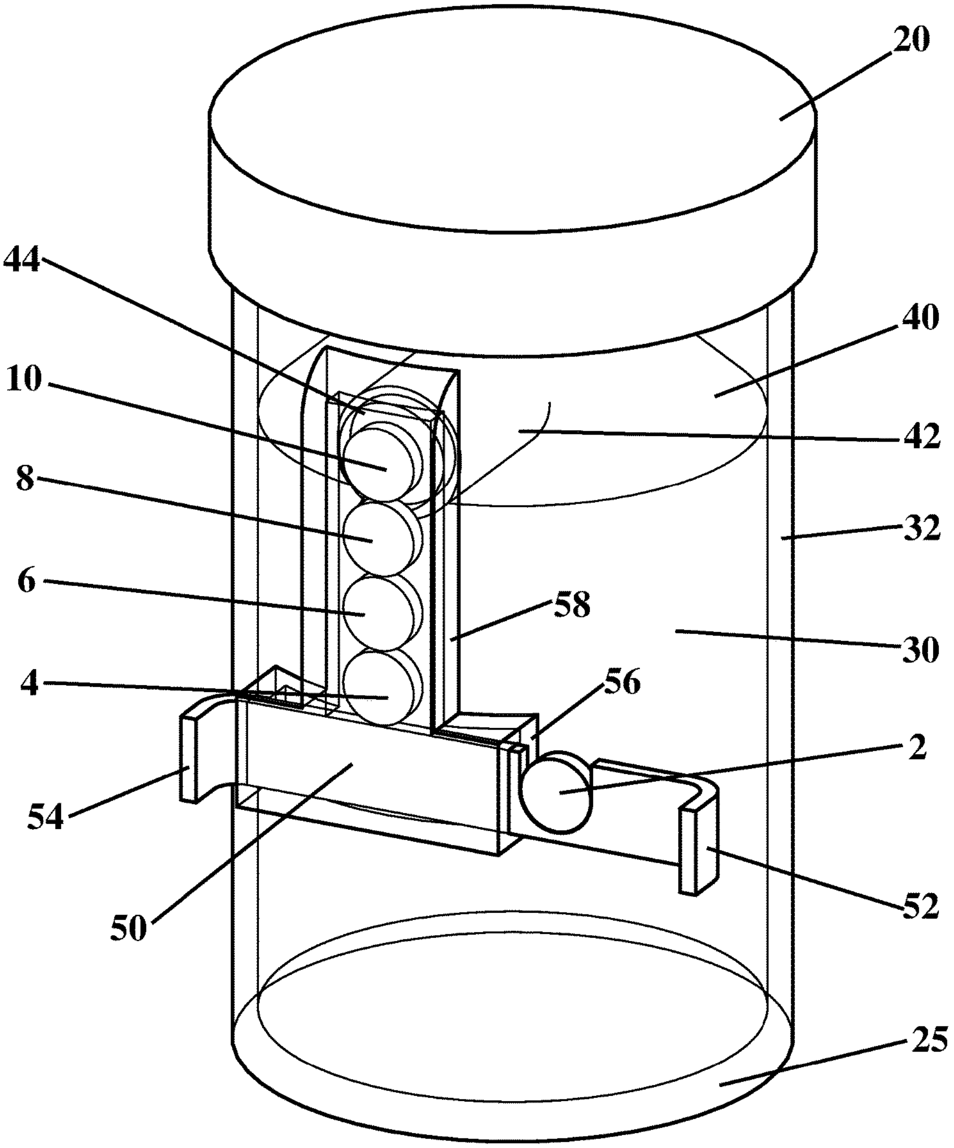
FIG. 2 shows a version of the bottle of FIG. 1 with the slide release mechanism moved allowing exit of a pill.

Referring still to FIG. 1, as well as FIG. 2, FIG. 2 shows a version of the bottle of FIG. 1 with the slide release mechanism 50, a type of blocking device, moved to allow exit of a pill. The slide release mechanism has two ends 52 and 54 which can have handles, as well as a portal, as shown, sized to fit a pill. The portal can be rectangular, circular, or otherwise, so long as the pill, such as pill 2, can fit therewithin. The horizontal tube 56 houses a portion of the blocking bar 50 there-within, such that the shaft 44 is within fluid communication there-with. As such, the interior of the pill bottle 30, the funnel 40, the shaft 44, and the portal of the blocking bar 50 are in continuous communication with one another, in embodiments of the disclosed technology, allowing a pill, such as pill 2, to exit from the interior space to the blocking bar 50 portal. The blocking bar itself is locked in position except at timed intervals, as will be discussed below.

Referring now specifically to FIG. 2, when the slide release mechanism/blocking bar 50 is moved, the bar is moved horizontally with respect to the orientation of the figure, though any orientation is within the scope of the disclosed technology. By pushing and/or pulling one of the exposed ends 52/54, the pill 2 is moved from the shaft/exit tube 56/58 and is accessible to the outside. Now, a person can remove the pill, but most push the bar 52/54 back into its initial position, in communication with the shaft 44, in order to let another pill drop there-in. In this manner, the removal of pills can be controlled or dosed by allowing only a certain number of pills to exit per unit of time. This is accomplished by locking movement of the bar 50, a type of blocking device. It can be locked by locking mechanisms known in the art, such as solenoid switches, latches, magnets, keys, mechanical locks, or the like.

Figure 3:
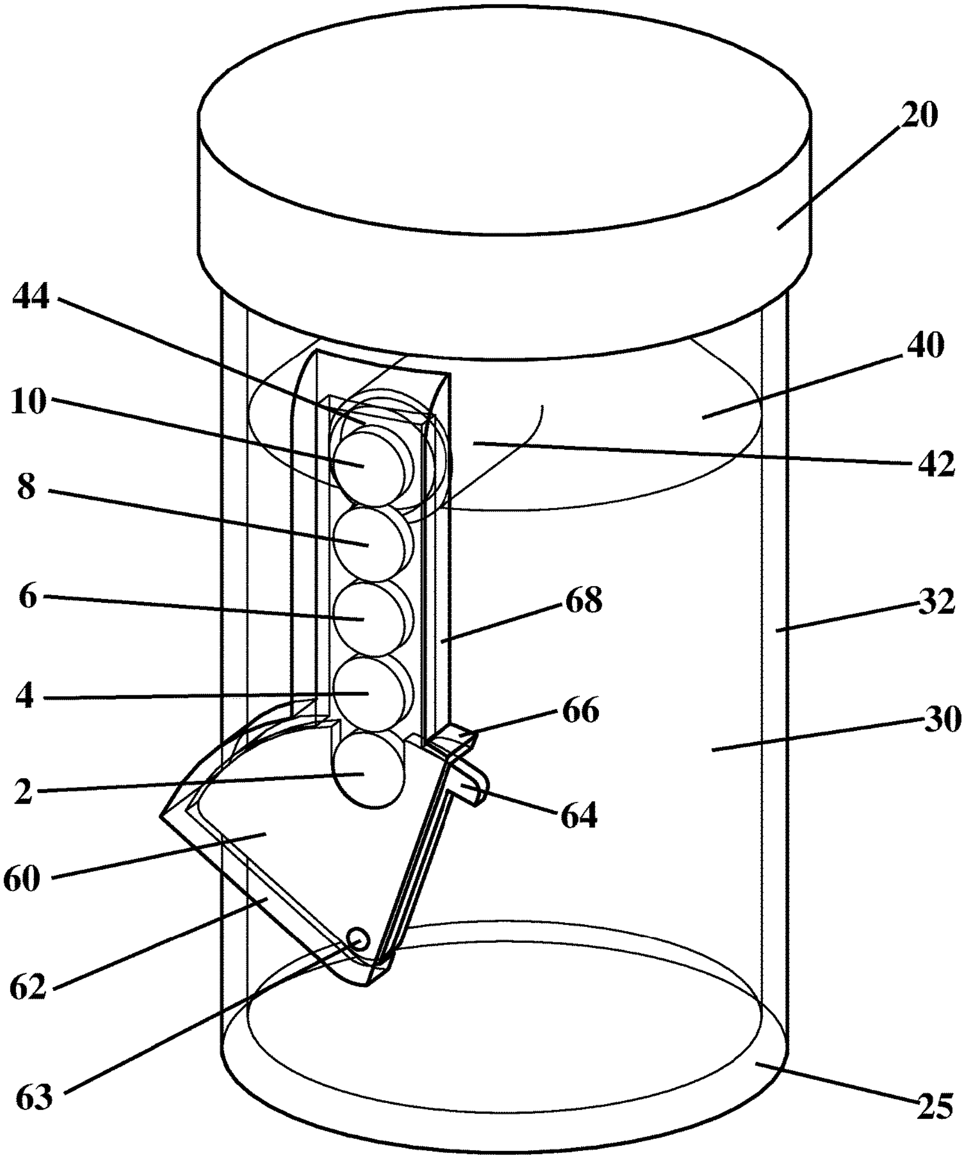
FIG. 3 shows a lockable pill bottle with rotatable release mechanism of an embodiment of the disclosed technology.

FIG. 3 shows a lockable pill bottle with rotatable release mechanism of an embodiment of the disclosed technology. Here, elements shown in FIGS. 1 and 2 are numbered identically, or, where different but analogous, incremented by 10. Here, the rotatable member 60 with a stationary outer portion 62 is rotated about an axis/pin 63. As shown in the figure, in a first configuration the portal thereof with pill 2 is within, or functionally connected with, the shaft 44 having side walls 68 and horizontal portal 66. A handle 64 can be used to rotate the rotatable member 60, a form of blocking bar. The pills 2, 4, 6, 8, and 10 line up in a row with each other; but when the blocking bar is moved (in this case, when the rotatable member 60 is rotated), the alignment of one of the pills (here, pill 2) is broken.

Figure 4:
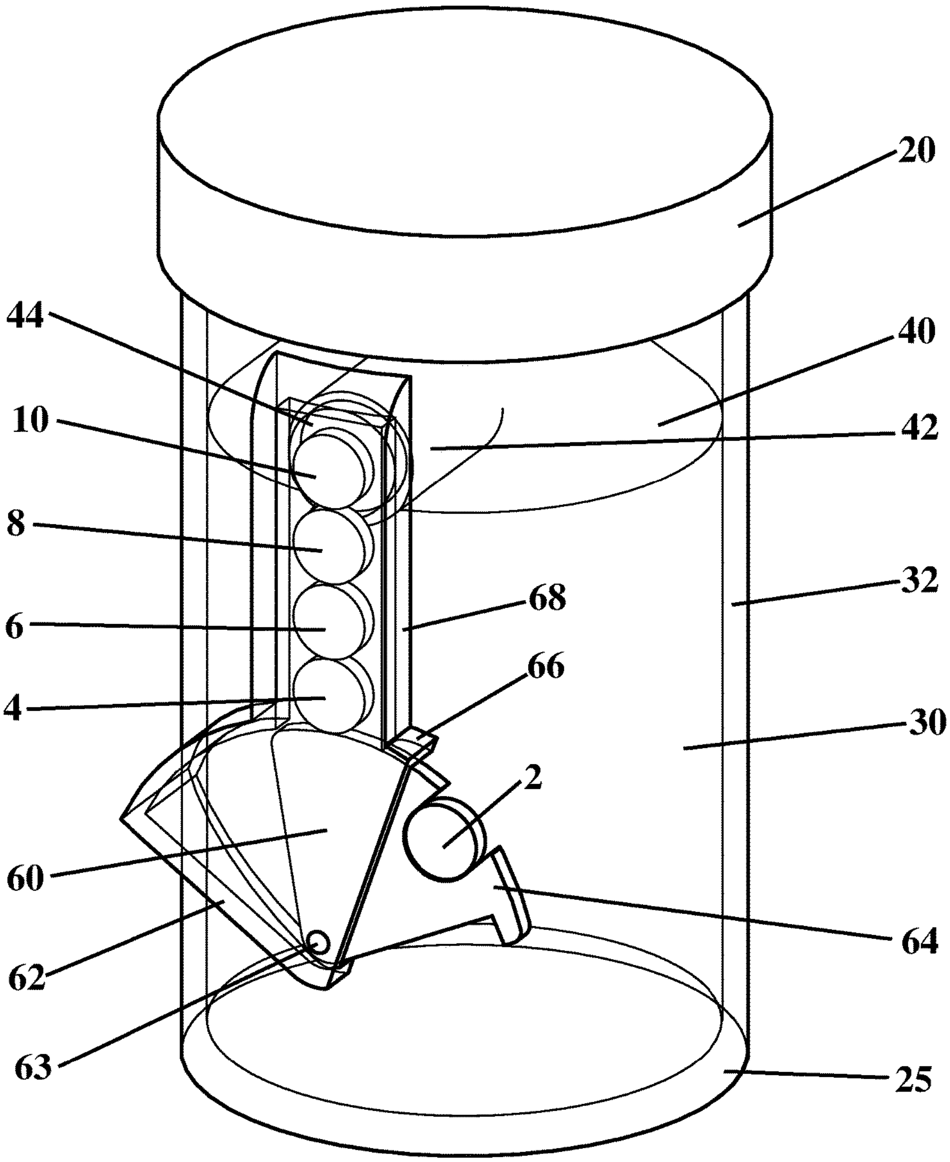
FIG. 4 shows a version of the bottle of FIG. 3 with the rotatable release mechanism moved, allowing exit of a pill.

FIG. 4 shows a version of the bottle of FIG. 3 with the rotatable release mechanism moved to allow exit of a pill. Here, it can be seen that the handle 64 is connected in unitary fashion with an interior portion of the blocking and rotating mechanism 60, having the internal rotatable part and external stationary part 62. The pill 2 is then rotated out of the shaft and is accessible and exterior to the bottle 30. A pill is defined as a dosage of medication in any one of tablet, capsule, caplet, or variant forms. The rotatable member 60 may be locked in place by preventing rotation (by frictional grasping) of the pin 63.

Figure 5:
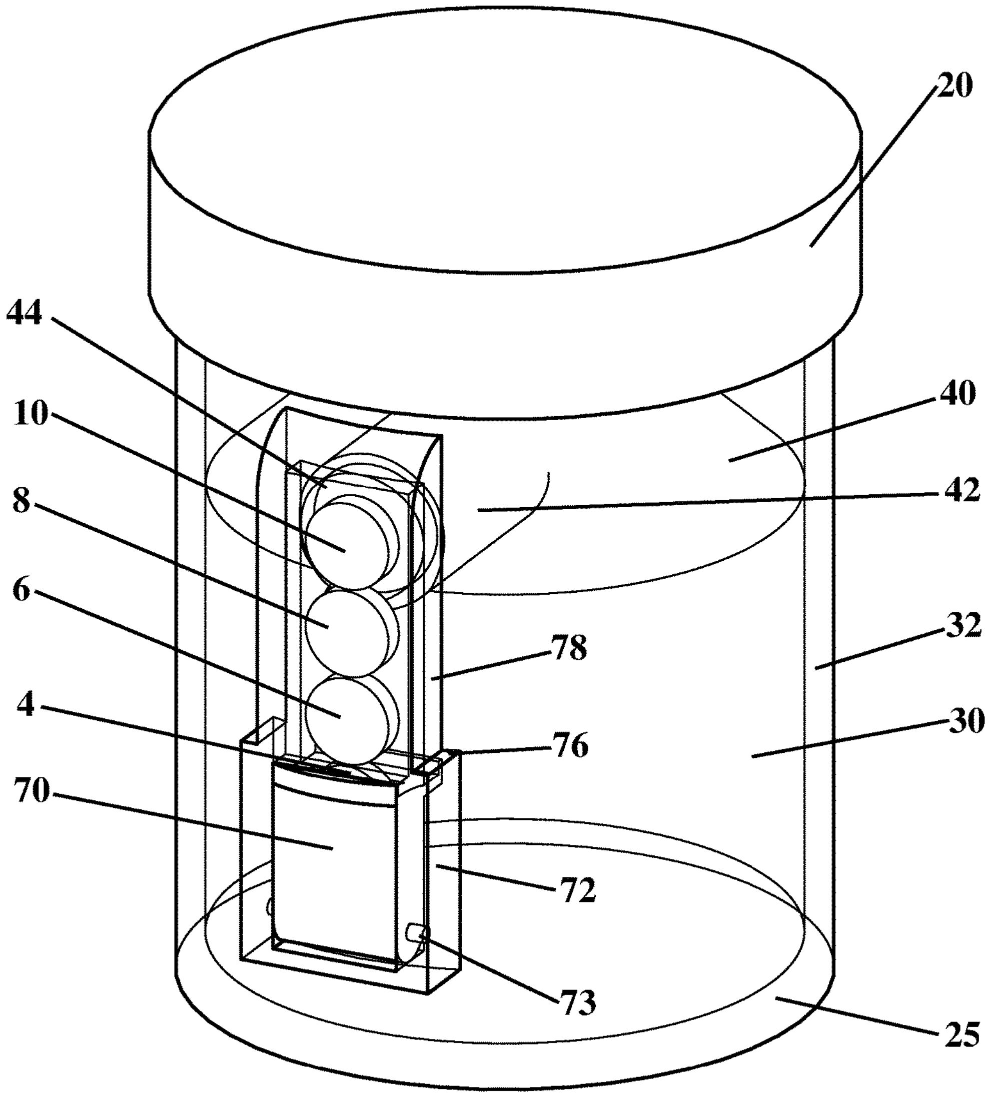
FIG. 5 shows a lockable pill bottle with push button release mechanism of an embodiment of the disclosed technology.

FIG. 5 shows a lockable pill bottle with push button release mechanism of an embodiment of the disclosed technology. Here a push button 70 is used and locked into place by way of pin 73. A portal within the push button 70 houses a pill such as pill 2 (not shown) or 4. The push button is further retained in a housing 72 having a top 76 which forms a unitary structure with, or engages with, the side walls 78 of the exit tube having a shaft 44. The push button is prevented from moving except at timed intervals or based on a unit of time, as will be described below.

Figure 6:
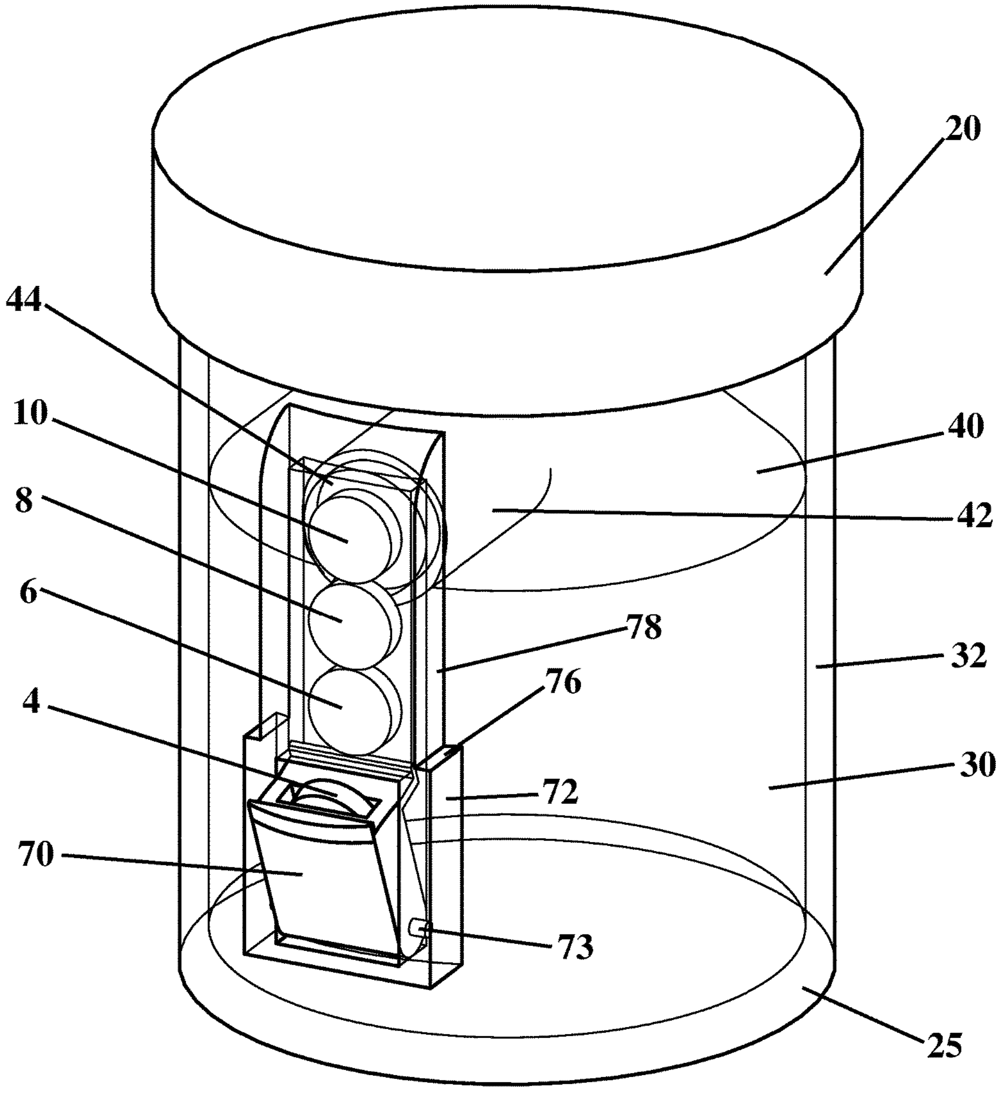
FIG. 6 shows a version of the bottle of FIG. 5 with the push button release mechanism moved allowing exit of a pill.

FIG. 6 shows a version of the bottle of FIG. 5 with the push button release mechanism moved to allow exit of a pill. Here the pill 4 is accessible to the outside, while the pills 6, 8, and 10 remain locked within the pill bottle housing 30 and in the shaft/exit tube 44. One pushes on the push button 70, depressing a spring and causing the spring to expand and dislodge a retaining mechanism holding the push button in place, allowing the push button 70 to tilt about pin 73. When the push button is tilted away from a vertical direction, the pill becomes accessible.

Figure 7:
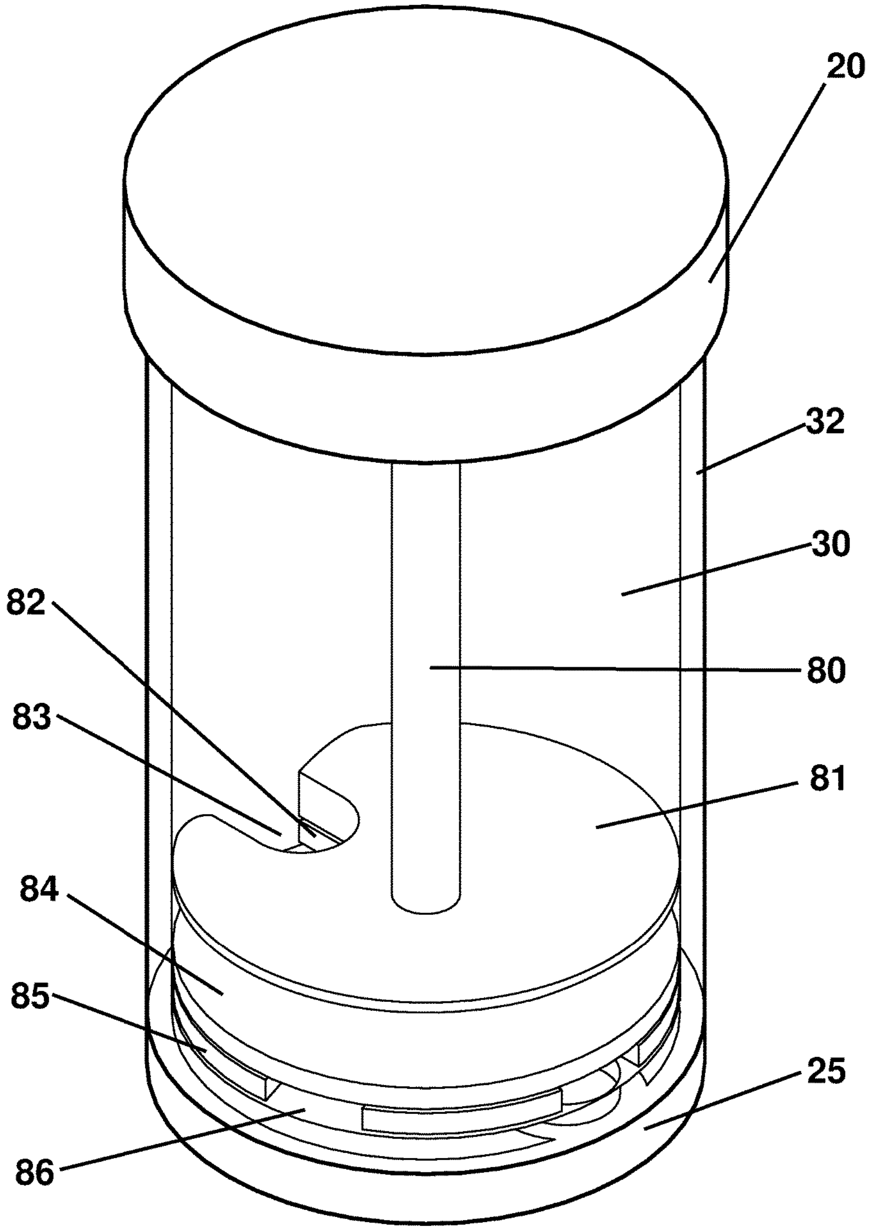
FIG. 7 shows a lockable pill bottle with a rotating disc of an embodiment of the disclosed technology.

FIG. 7 shows a lockable pill bottle with a rotating disc of an embodiment of the disclosed technology. Here, a central shaft 80 passes from the top cover 20 to the bottom 25. A rotatable disc 84 with a portal 85 is rotated at each exit of a pill. This disc has multiple portals (see below figures) each holding a pill. An upper disc 82 has a funnel 86 to funnel the pills into the portals, such as portal 85, and then allows the pills to drop through an exit tube 88 and out of the bottle by way of the sides of the device 30/32 through a portal-therewith or the bottom 25.

Figure 8:
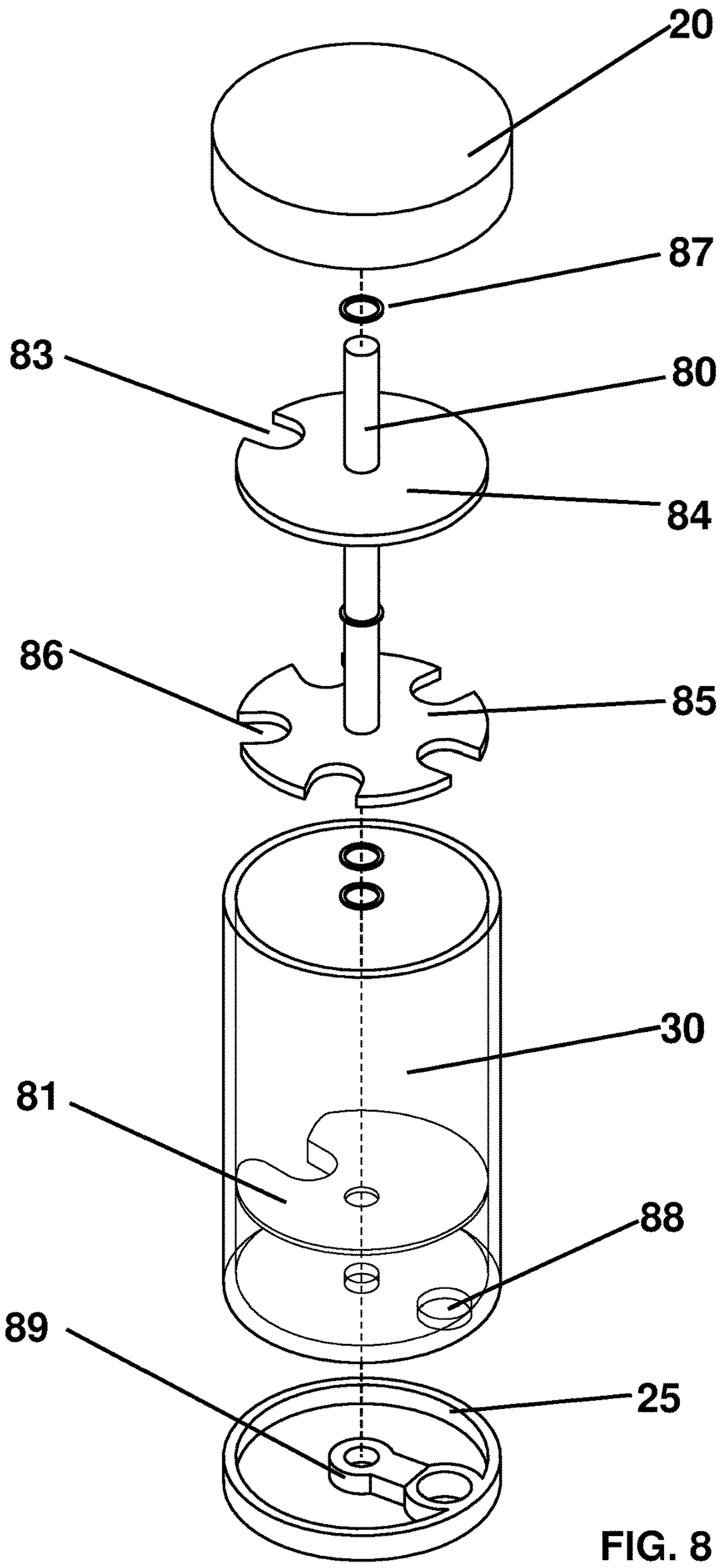
FIG. 8 shows an exploded version of the bottle of FIG. 7.
Figure 9:
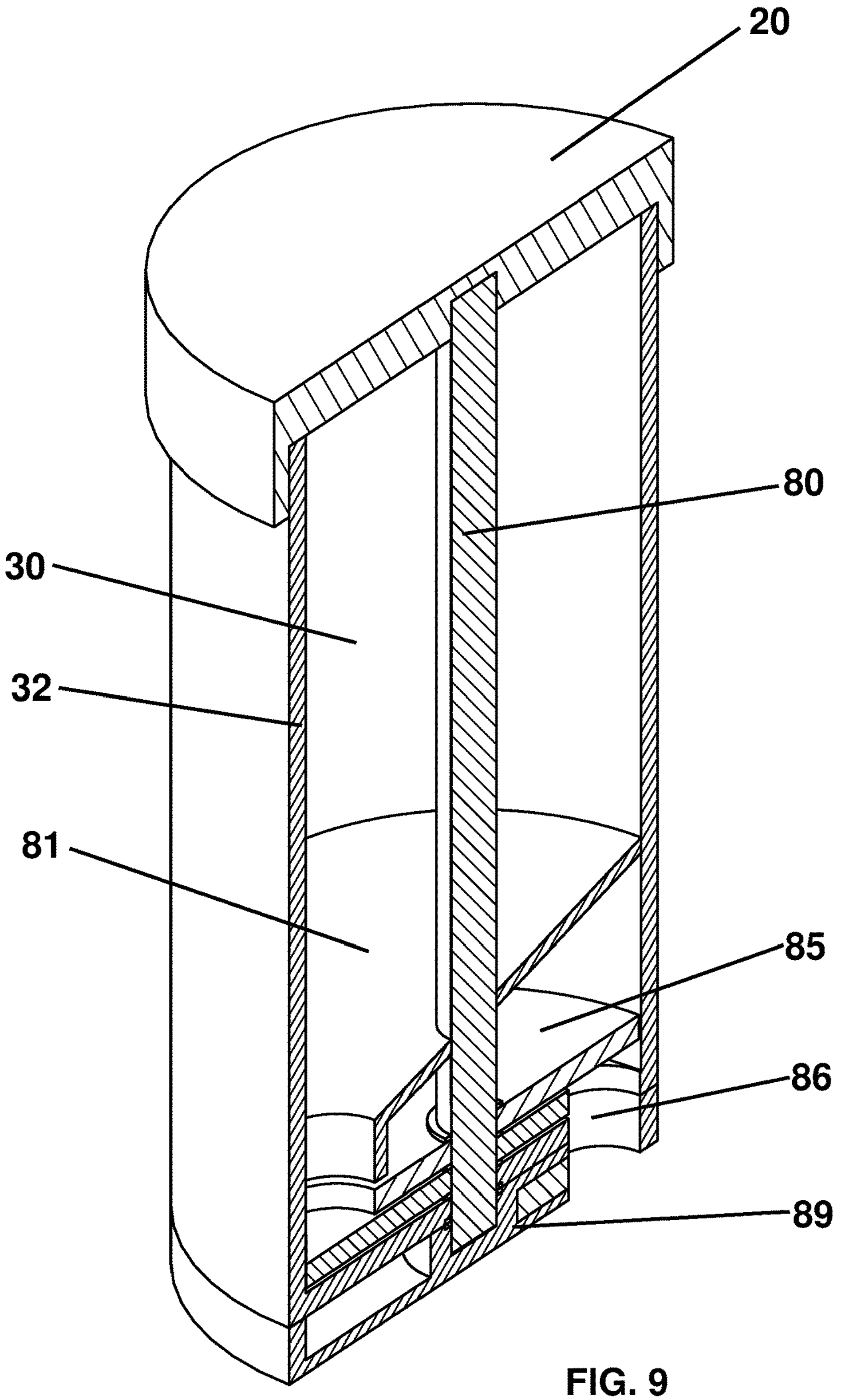
FIG. 9 shows a cutaway version of the bottle of FIG. 7.

FIG. 8 shows an exploded version of the bottle of FIG. 7. FIG. 9 shows a cutaway version of the bottle of FIG. 7. In this exploded view it is seen how the rotatable disc 84 has multiple portals through which a pill can exit. The disc 82 with portal 86 is optional and may not be used in embodiments of the disclosed technology. From top to bottom, one sees the top cover 20 above a gasket 87 reducing friction between the plate 84 and/or plate 81. The pills are held, en masse (greater than 6 pills) above these items. The pill bottle housing 30 itself has side walls or side layer 32 with an opiate antagonist (as shown in prior figures), in embodiments of the disclosed technology. The bottom of the device 25 has a portal 89, such as a threaded portal for placement and holding of the central shaft 80, and the exit tube is seen at 88 of the side walls 30 as well as passing through the bottom 25 and other layers between the pills, such at, at the portals 86 and 83 of the the respective horizontal members 85 and 84. Though a particular embodiment is shown, this embodiment covers any rotatable disc placed between an exit tube (e.g., exit tube 88) and body of a pill bottle which is prevented from rotation and/or allowed to rotate only at distinct units of time to prevent over-dosage or exiting of more pills than authorized by a physician or authorized for use by a particular person. The funnel in horizontal member 81 can be on one or multiple objects, as shown, and the funnel may be of any depth and may have a greater width upper side and lesser width lower side. The funnel, for example, can fill the majority of the open length between a plate at a top side of the funnel portal and the cover 20. The funnel or any one of the plates can be in parallel to the bottom 25 or top 20, or at an acute or obtuse angle there-to, as shown in FIG. 9.

Referring still to FIG. 8, it should be understood that pills reside above the horizontal layer 84 and/or the horizontal layer 86 and/or the horizontal layer 81. While these layers are shown in a particular order, they can be in any order in the device. The layer 86 rotates around, it's rotation controlled by a fixed connection or grooved connection to the stem 80 which rotates at intervals, such as when another pill may be taken by a patient. This causes pill from the chamber (interior housing 30) to fall into a different portal on the layer 85, such as into portal 86. The layer 86 can rotate with the layer 83 and be attached to/rotate with the stem 80. The layer 81 can also rotate therewith and be attached to the stem 80 or be spaced apart from the exit portal 88. In embodiments, pills are rotated around the layer 86 until reaching the portal 88 where they can exit, each rotation at a timed interval and/or based on the press of an exterior button signaling that the patient wishes to have a pill exit from the device. The button presses may, for example be in the form of pressure applied on device 60 shown in FIG. 4.

Figure 10:
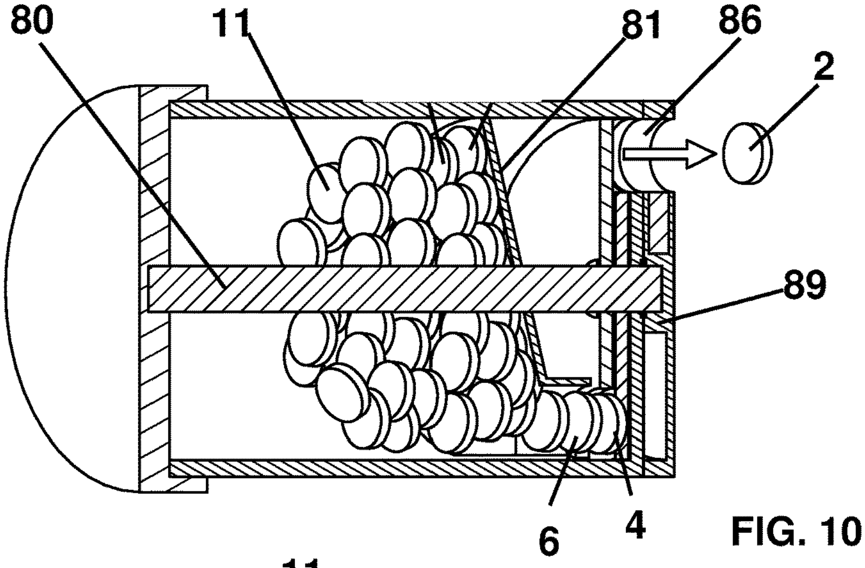
FIG. 10, FIG. 11, and FIG. 12 show the rotating disc pill bottle of FIG. 7 in use, allowing a pill to exit.
Figure 11:
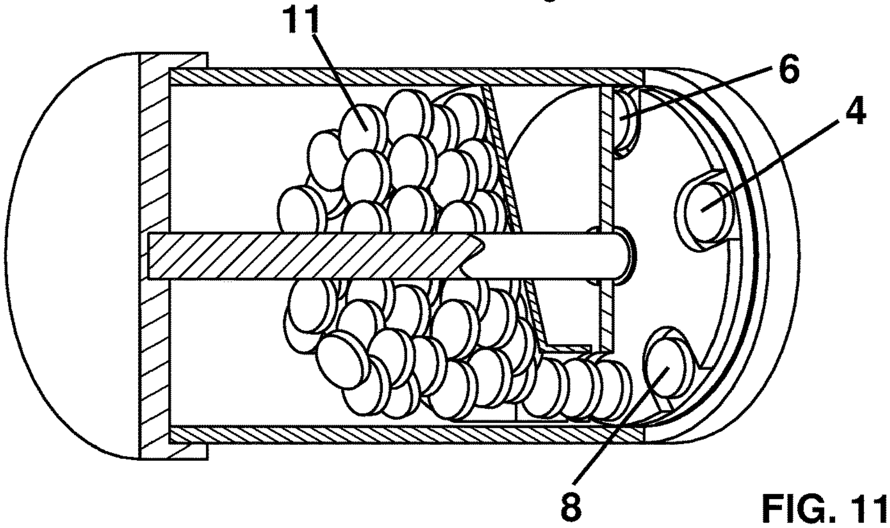
Figure 12:
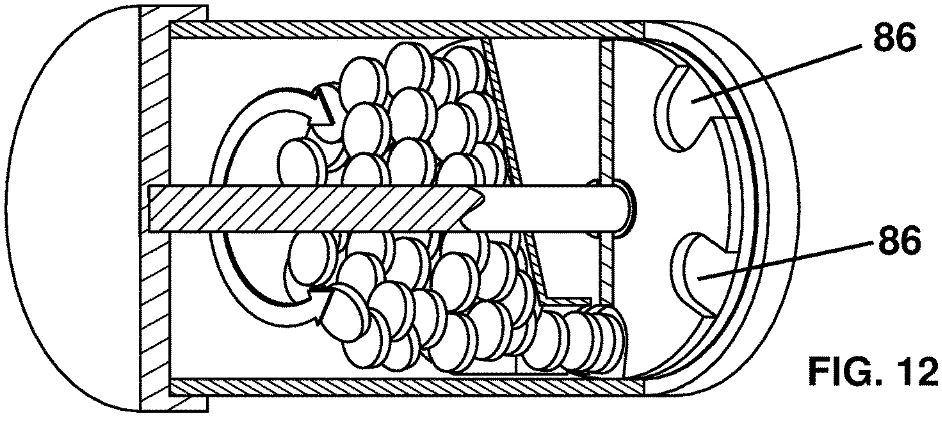

FIG. 10, FIG. 11, and FIG. 12 show the rotating disc pill bottle of FIG. 7 in use allowing a pill to exit. In FIG. 10, the pills are falling directly from the interior of the housing 30 with 6 and 4 already dropping below the layer 81 which is shown having an obtuse angle with respect to the bottom layer 89 of the device. The pills 4 and 6 are in the funnel created in an opening and dropping into the rotating layer 85 having portals 86. and pill 2 already having exited. As the member 84 rotates around, pills drop into the funnel area (between the side wall and the layer 81 having a funnel there-in). In FIG. 11, pills 4, 6, and 8 are in the rotating layer 85 and specifically in the portals 86 (labeled as such in FIGS. 10 and 12).

Viewing FIGS. 12, 11, and 10 in reverse order, in FIG. 12 one sees that the pills are in the housing and falling downwards past the funnel area with a first pill in the rotating member 85. Based on a time to take a pill and/or interval of time when pills can exit and/or button pressed indicating that a pill should exit as discussed with reference to FIG. 13 below, a first pill enters a portal 86 of the rotating member 85. The portal 86 is cut entirely through the circular shape of the rotating member 85 with multiple portals, each housing a pill between it's concave surface cut-therein to the member. As the rotating member 85 rotates, as shown in FIG. 11, the pills fill each space/portal 86. Upon reaching the other side, a portal with pill lines up with an exit tube and a pill exits from the bottom of the device. The position of the funnel (passageway from the interior hollow space where the mass of pills is held) relative to the exit tube/exit area where the pills exist can be at any position around the device with respect to the bottom side. As such, a pill can be required to rotate any amount under 360 degrees, such as 288 degrees, 270 degrees, or 180 degrees to pass from the funnel to the exit tube.

Figure 13:
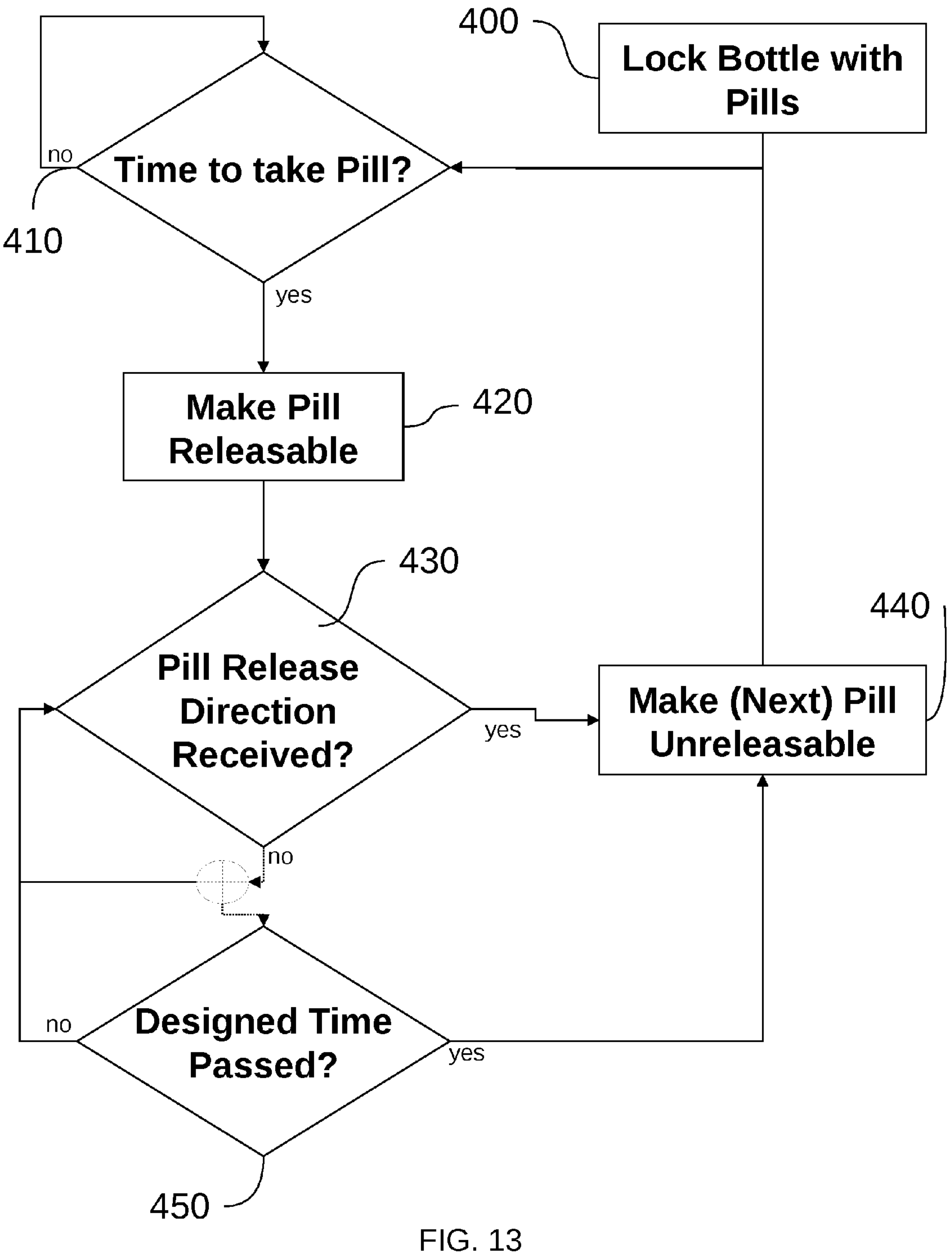
FIG. 13 shows a flowchart of a method of timing pill release, using the devices shown in FIGS. 1 through 12, in an embodiment of the disclosed technology.

FIG. 13 shows a flowchart of a method of timing pill release using the devices shown in FIGS. 1 through 12, in an embodiment of the disclosed technology. In a first step 400, a pill bottle, such as those shown and described with reference to the prior figures, is filled with a requisite amount of pills and locked by a pharmacist, doctor, of caregiver. In the course of locking, the bottle is also programmed, such as through a wired or wireless interface with a dedicated bottle programming device or personal computer, or via entry of a programming code, using buttons on the pill bottles. The bottle is then ready to dispense medication. Based on the program, it is determined in step 410 whether it is time to take a pill. If it is not, the step is repeated until the time to take a pill (or pills) has arrived. Once the time arrives, in step 420 the pill is made releasable, and then, in step 430, it is determined if a pill-release instruction has been received. A direction to release the pills may be in the form of automated release, partially-automated release, or manual release. Automated release causes the pill to drop into a release area at the designated time. Partially-automated release is a mechanical release of an element within the pill bottle, such as dropping the pill into a release area, moving/rotating a blocking bar, or relieving pressure on a pill) allowing the pill to be released if, and only if, a user takes a further action. Manual release takes no mechanical action at the time of arrival of the release, unless a user mechanically acts on the device through a button press or other physical action, or equivalent thereof.

Depending on whether the device is designed or configured in a particular instance for automated, partially-automated, or manual release, once a pill release direction is received, then the next pill or next dose of pills is rendered unreleasable in step 440. This is carried out by moving a blocking bar back into place, locking a mechanical button, or by way of other methods described with reference to the prior figures. If a pill release direction is not received, in step 430 in a manual or semi-manual operating mode, then step 430 is repeated continuously, in one embodiment, until the pill is released. However, the pill release may have a designated time limit. In such an embodiment, the clock starts running from the time the pill (or pills) is made releasable in step 420. This is shown in step 450 where it is determined, after the pill is releasable, if a designated amount of time has passed. If no, then steps 430 and 450 are repeated until either the pill is released or the designated amount of time for pill release has passed. Once either of these questions is answered in the affirmative, the pill becomes unreleasable until it is time to take the next pill.

Variations, depending on implementation, allow the time frame for future pill releases to be dependent upon the last pill release time, within upper and lower limits. For example, a person may be allowed to take a pill or dosage of medicine no more than once an hour, or no more than four pills in a six hour period. Thus, a first pill will be releasable (step 420) at the zero hour mark. A person may take this pill (when a semi-automated or manual mode is being used) at the 15 minute time interval. The next pill becomes releasable (step 420) at the one hour fifteen minute mark, not the one hour mark. In this manner, using a portable pill bottle, doctors and pharmacists can dose medication without having constant supervision over the patient, thereby allowing the patient to leave, for example, a hospital where such supervision is often used to dose medication, giving a person an ability to take narcotics with much less risk of misuse, or over-dosage, and much more precision than typically afforded for pill dispensing in a hospital setting where nurses must speedily turn from patient to patient. This, in effect, gives more control to the patient.

Figure 14:
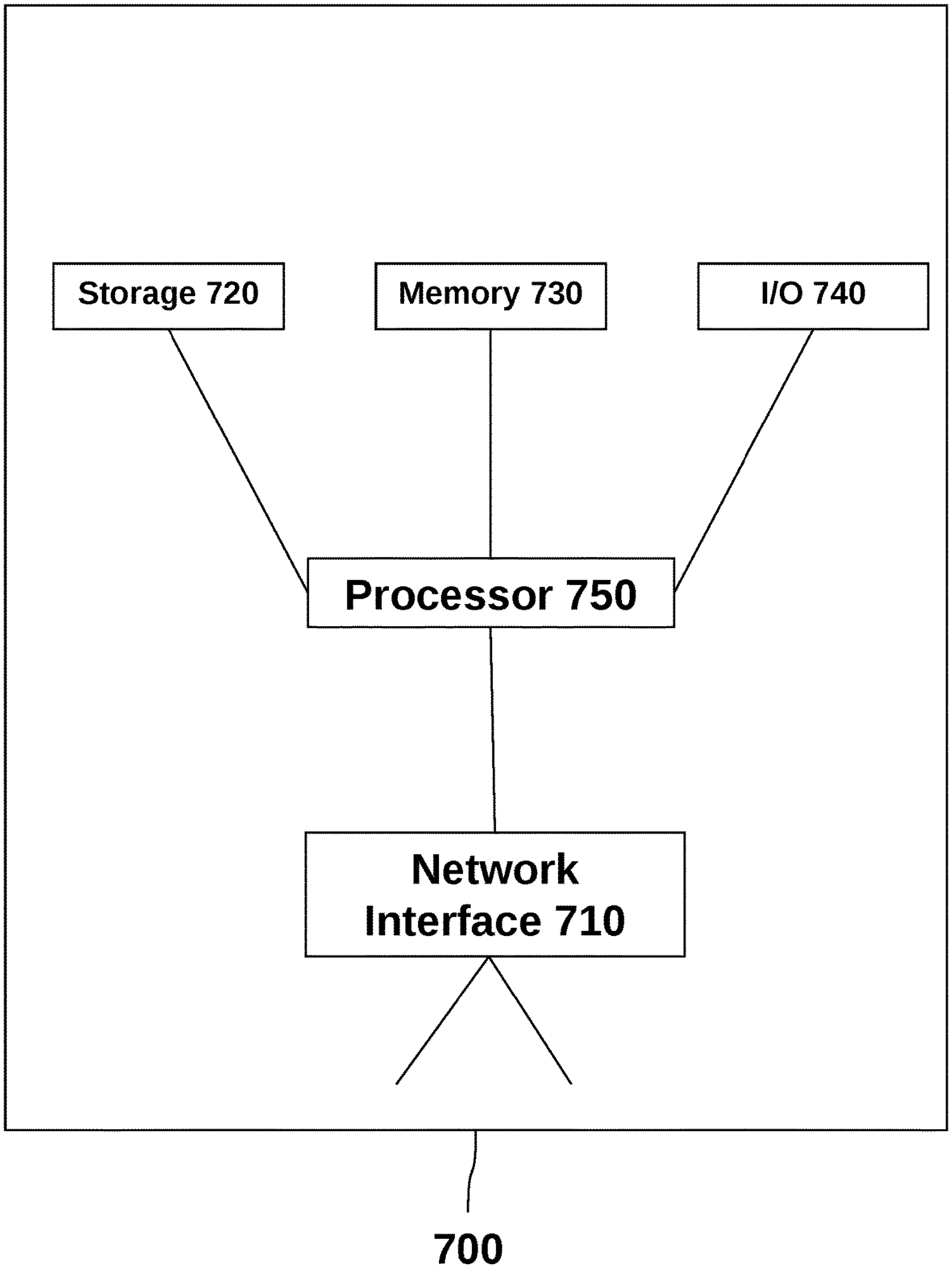
FIG. 14 shows a high-level block diagram of a device that may be used to carry out the disclosed technology.

FIG. 14 shows a high-level block diagram of a device that may be used to carry out the disclosed technology. Device 700 comprises a processor 550 that controls the overall operation of the computer by executing the device's program instructions which define such operation. The device's program instructions may be stored in a storage device 720 (e.g., magnetic disk, database) and loaded into memory 730 when execution of the bottle's program instructions is desired. Thus, the device's operation will be defined by the device's program instructions stored in memory 730 and/or storage 520, and the console will be controlled by processor 750 executing the console's program instructions. A device 700 also includes one or a plurality of input network interfaces for communicating with other devices via a network (e.g., the Internet). The device 700 further includes an electrical input interface. A device 700 also includes one or more output network interfaces 710 for communicating with other devices. Device 700 also includes input/output 740 representing devices which allow for user interaction with a computer (e.g., display, keyboard, mouse, speakers, buttons, etc.). One skilled in the art will recognize that an implementation of an actual device will contain other components as well, and that FIG. 16 is a high level representation of some of the components of such a device for illustrative purposes. It should also be understood by one skilled in the art that the method and devices depicted in FIGS. 1 through 15 may be implemented on a device such as is shown in FIG. 16.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

We claim:

1. A lockable pill bottle for a plurality of pills, comprising:

a container with a pill holder and funnel directing said plurality of pills in said container single file into a shaft in continuous communication with said funnel; and a portal in continuous communication with said shaft for removal of pills from said pill bottle, wherein said shaft is translucent and comprises a chemical situated between translucent layers of said shaft, which chemical, will destroy a narcotic or other drug contained or comprised within the pills if said pill bottle is tampered with.

2. The lockable pill bottle of claim 1, further comprising:

a movable blocking device fixedly attached to said pill bottle, said movable blocking device, in a first position, is locked in place with said portal;

a mechanism which unlocks said movable blocking device, allowing said blocking device to be manually moved to a second position where said portal is spaced apart from, and is no longer in communication with said shaft;

wherein said portal is disposed exterior to a wall of said pill bottle after said blocking device is manually moved to said second position.

3. The lockable pill bottle of claim 1, wherein a width of said shaft and said portal are equal.

4. The lockable pill bottle of claim 1, wherein when said blocking device is moved to said second position, a pill of said plurality of pills is removable from said portal which is disposed exterior to said wall of said pill bottle.

5. The lockable pill bottle of claim 4, wherein after removal of said pill disposed exterior to said wall of said pill bottle from said portal, said shaft is re-filled with at least one additional pill of said plurality of pills by turning said bill bottle at least 90 degrees from a direction of said bottle when said removal took place.

6. The lockable pill bottle of claim 4, wherein said movable blocking device slides from said first position with said portal in communication with said shaft into said second position, with said pill disposed exterior to said wall of said pill bottle.

7. The lockable pill bottle of claim 6, wherein said movable blocking device slides laterally, said movable blocking device is elongated, and said movable block device further comprises said portal cut into an elongated side thereof.

8. The lockable pill bottle of claim 6, wherein said movable blocking device slides circumferentially around a point at which said movable blocking device is attached to said pill bottle.

9. The lockable pill bottle of claim 8, wherein said point at which said movable blocking device is attached is to an exterior side of said pill bottle, such that a direction that said movable blocking device slides is perpendicular to said exterior side of said pill bottle.

10. The lockable pill bottle of claim 8, wherein said point at which said movable blocking device is attached is to a base of said pill bottle, such that a direction that said movable blocking device slides is perpendicular to said base.

11. The lockable pill bottle of claim 10, wherein said movable blocking device comprises multiple said portals which extend through said movable blocking device, such that a pill in a portal of said multiple portals touches said base of said pill bottle.

12. The lockable pill bottle of claim 11, wherein a single portal of said multiple portals is in communication with said shaft when a single different portal of said multiple portals allows said pill to exit from said pill container.

13. The lockable pill bottle of claim 6, wherein upon detection of movement of said movable blocking device and return of said movable blocking device to said first position with said shaft in communication with said portal, said movable blocking device is locked again in said first position.

14. The lockable pill bottle of claim 6, wherein upon detection of movement of said movable blocking device and return of said movable blocking device to said first position with said shaft in communication with said portal, said movable blocking device is locked again for an amount of time equal to said pre-determined period of time, minus an amount of time passed since a previous pre-determined period of time has passed.

15. The lockable pill bottle of claim 1, wherein at least some of said plurality of pills in said shaft are visible from an outside of said pill bottle.

16. The lockable pill bottle of claim 1, further comprising said chemical within walls of said pill bottle.

17. The lockable pill bottle of claim 1, wherein said chemical comprises an opioid antagonist.

* * * * *